(12) United States Patent
Liu

(10) Patent No.: US 11,609,469 B2
(45) Date of Patent: Mar. 21, 2023

(54) LIQUID CRYSTAL DISPLAY PANEL AND LIQUID CRYSTAL DISPLAY DEVICE

(71) Applicant: TCL CHINA STAR OPTOELECTRONICS TECHNOLOGY CO., LTD., Guangdong (CN)

(72) Inventor: Jing Liu, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 432 days.

(21) Appl. No.: 16/757,517

(22) PCT Filed: Mar. 20, 2020

(86) PCT No.: PCT/CN2020/080348
§ 371 (c)(1),
(2) Date: Apr. 20, 2020

(87) PCT Pub. No.: WO2021/174599
PCT Pub. Date: Sep. 10, 2021

(65) Prior Publication Data
US 2022/0308372 A1 Sep. 29, 2022

(30) Foreign Application Priority Data
Mar. 5, 2020 (CN) .......................... 202010147618.6

(51) Int. Cl.
*G02F 1/1343* (2006.01)
*G02F 1/1337* (2006.01)
(Continued)

(52) U.S. Cl.
CPC .......... *G02F 1/137* (2013.01); *G02F 1/13439* (2013.01); *G02F 1/134309* (2013.01);
(Continued)

(58) Field of Classification Search
CPC ............. G02F 1/1337; G02F 1/133753; G02F 1/133761; G02F 1/1333; G02F 1/133345;
(Continued)

(56) References Cited

U.S. PATENT DOCUMENTS

| 5,786,879 A | 7/1998 | Kodera et al. |
| 5,822,031 A | 10/1998 | Kodera et al. |

(Continued)

FOREIGN PATENT DOCUMENTS

| CN | 1099148 A | 2/1995 |
| CN | 102736332 A | 10/2012 |

(Continued)

*Primary Examiner* — Thoi V Duong
(74) *Attorney, Agent, or Firm* — Dickinson Wright PLLC

(57) ABSTRACT

A liquid crystal display panel provided by an embodiment of the application includes an array substrate comprising a display area and a non-display area; a color filter substrate comprising a common electrode, and the common electrode is opposite to the display area and the non-display area; a liquid crystal molecular layer disposed between the array substrate and the color filter substrate; and a voltage alignment circuit electrically connected to the display area and the non-display area correspondingly.

14 Claims, 2 Drawing Sheets

(51) Int. Cl.
  *G02F 1/137* (2006.01)
  *G02F 1/1333* (2006.01)
  *G02F 1/1362* (2006.01)

(52) U.S. Cl.
  CPC ...... *G02F 1/1337* (2013.01); *G02F 1/133345* (2013.01); *G02F 1/133753* (2013.01); *G02F 1/136209* (2013.01)

(58) Field of Classification Search
  CPC ............ G02F 1/1343; G02F 1/134309; G02F 1/13439; G02F 1/134372; G02F 1/1351; G02F 1/136209; G02F 1/137; G02F 1/141
  See application file for complete search history.

(56) References Cited

U.S. PATENT DOCUMENTS

| | | | |
|---|---|---|---|
| 6,057,902 A | 5/2000 | Angelopoulos et al. | |
| 9,841,629 B2 | 12/2017 | Chen | |
| 2005/0213000 A1* | 9/2005 | Akimoto | G02F 1/133509 349/113 |
| 2018/0217419 A1 | 8/2018 | Xie | |
| 2019/0155069 A1 | 5/2019 | Xie | |

FOREIGN PATENT DOCUMENTS

| | | | | |
|---|---|---|---|---|
| CN | 104298006 A | | 1/2015 | |
| CN | 105892113 A | | 8/2016 | |
| JP | H0643462 A | | 2/1994 | |
| KR | 20070077704 | * | 7/2007 | ........... G02F 1/1333 |

* cited by examiner

LIQUID CRYSTAL DISPLAY PANEL AND LIQUID CRYSTAL DISPLAY DEVICE

BACKGROUND OF INVENTION

Field of Invention

The present application relates to the field of liquid crystal display technology, and particularly, to a liquid crystal display panel and a liquid crystal display device.

Description of Prior Art

Patterned vertical alignment technology (PVA) is a mainstream technology for achieving wide viewing angle of vertical alignment (VA) type thin filter transistor liquid crystal display (TFT-LCD). The technology uses a patterned transparent ITO pixel electrode. By applying a voltage, tilt orientation of liquid crystal molecules under action of an electric field is divided into multiple domains. Angular differences in brightness of different domains compensate each other to achieve a purpose of wide viewing angles. In order to reduce response time, the PVA TFT-LCD needs to be aligned in advance, that is, a voltage is applied between a pixel electrode and a common electrode, and ultraviolet light is irradiated to orient liquid crystals to solidify and generate a pretilt angle. The larger the applied voltage, the larger the pretilt angle and the faster the response speed; however, it will cause contrast to decrease.

SUMMARY OF INVENTION

The purpose of an embodiment of the present application is to provide a liquid crystal display panel and a liquid crystal display device. By providing a larger alignment electric field in a non-display area, the pretilt angle of liquid crystal molecules in the non-display area is large, and during display, the alignment electric field can push the liquid crystals in the display area to tilt quickly and improve the response speed.

The embodiment of the present application provides a liquid crystal display panel, comprising: an array substrate comprising a display area and a non-display area; a color filter substrate comprising a common electrode, wherein the common electrode is opposite to the display area and the non-display area; a liquid crystal molecular layer disposed between the array substrate and the color filter substrate; and a voltage alignment circuit electrically connected to the display area and the non-display area correspondingly, wherein the voltage alignment circuit is configured to apply an alignment voltage to the display area and the non-display area, such that an alignment electric field between the non-display area and the common electrode is stronger than an alignment electric field between the display area and the common electrode.

In the liquid crystal display panel described in the embodiment of the present application, the liquid crystal molecular layer comprises a first liquid crystal molecular section opposite to the display area and a second liquid crystal molecular section opposite to the non-display area, and when the liquid crystal display panel is aligned, a pretilt angle of the first liquid crystal molecular section is smaller than a pretilt angle of the second liquid crystal molecular section.

In the liquid crystal display panel described in the present application, the display area comprises a plurality of pixel electrodes, and the non-display area comprises a plurality of light-shielding metal electrodes; and wherein the voltage alignment circuit is electrically connected to the plurality of pixel electrodes and the plurality of light-shielding metal electrodes correspondingly, such that an alignment voltage is provided to each of the pixel electrodes and each of the light-shielding metal electrodes.

In the liquid crystal display panel described in the present application, a first distance value between the light-shielding metal electrodes and the common electrode is greater than a second distance value between the pixel electrodes and the common electrode; and wherein an alignment voltage applied to the light-shielding metal electrodes by the voltage alignment circuit is greater than an alignment voltage applied to the pixel electrodes.

In the liquid crystal display panel described in the present application, a first distance value between the light-shielding metal electrodes and the common electrode is equal to a second distance value between the pixel electrodes and the common electrode; and wherein an alignment voltage applied to the light-shielding metal electrodes by the voltage alignment circuit is greater than an alignment voltage applied to the pixel electrodes.

In the liquid crystal display panel described in the embodiment of the present application, a first distance value between the light-shielding metal electrodes and the common electrode is smaller than a second distance value between the pixel electrodes and the common electrode; and wherein an alignment voltage applied to the light-shielding metal electrodes by the voltage alignment circuit is greater than or equal to an alignment voltage applied to the pixel electrodes, so that an alignment electric field between the light-shielding metal electrodes and the common electrode is stronger than an alignment electric field between the pixel electrodes and the common electrode.

In the liquid crystal display panel described in the embodiment of the present application, the array substrate comprises: a substrate having the display area and the non-display area; the plurality of light-shielding metal electrodes disposed on the substrate and located in the non-display area; an insulating layer disposed on the light-shielding metal electrodes and the substrate; and a pixel electrode layer disposed on the insulating layer comprising the plurality of pixel electrodes and an auxiliary electrode, wherein the pixel electrodes are opposite to the display area, the auxiliary electrode is opposite to the non-display area, and the light-shielding metal electrodes are electrically connected to the auxiliary electrode.

In the liquid crystal display panel described in the embodiment of the present application, a thickness of the auxiliary electrode is greater than a thickness of the pixel electrodes, so that a distance between an upper surface of the auxiliary electrode and the common electrode is less than a distance between an upper surface of the pixel electrodes and the common electrode.

In the liquid crystal display panel described in the embodiment of the present application, a thickness of the auxiliary electrode is equal to a thickness of the pixel electrodes.

In a second aspect, the embodiment of the present application further provides a liquid crystal display device, comprising a liquid crystal display panel, wherein the liquid crystal display pane comprises: an array substrate comprising a display area and a non-display area; a color filter substrate comprising a common electrode, wherein the common electrode is opposite to the display area and the non-display area; a liquid crystal molecular layer disposed between the array substrate and the color filter substrate; and a voltage alignment circuit electrically connected to the display area and the non-display area correspondingly, wherein the voltage alignment circuit is configured to apply an alignment voltage to the display area and the non-display area, such that an alignment electric field between the non-display area and the common electrode is stronger than an alignment electric field between the display area and the common electrode.

In the liquid crystal display device described in the present application, the liquid crystal molecular layer comprises a first liquid crystal molecular section opposite to the display area and a second liquid crystal molecular section opposite to the non-display area, and when the liquid crystal display panel is aligned, a pretilt angle of the first liquid crystal molecular section is smaller than a pretilt angle of the second liquid crystal molecular section.

In the liquid crystal display device described in the present application, the display area comprises a plurality of pixel electrodes, and the non-display area comprises a plurality of light-shielding metal electrodes; and wherein the voltage alignment circuit is electrically connected to the plurality of pixel electrodes and the plurality of light-shielding metal electrodes correspondingly, such that an alignment voltage is provided to each of the pixel electrodes and each of the light-shielding metal electrodes.

In the liquid crystal display device described in the present application, a first distance value between the light-shielding metal electrodes and the common electrode is greater than a second distance value between the pixel electrodes and the common electrode; and wherein an alignment voltage applied to the light-shielding metal electrodes by the voltage alignment circuit is greater than an alignment voltage applied to the pixel electrodes.

In the liquid crystal display device described in the present application, a first distance value between the light-shielding metal electrodes and the common electrode is equal to a second distance value between the pixel electrodes and the common electrode; and wherein an alignment voltage applied to the light-shielding metal electrodes by the voltage alignment circuit is greater than an alignment voltage applied to the pixel electrodes.

In the liquid crystal display device described in the present application, a first distance value between the light-shielding metal electrodes and the common electrode is smaller than a second distance value between the pixel electrodes and the common electrode; and wherein an alignment voltage applied to the light-shielding metal electrodes by the voltage alignment circuit is greater than or equal to an alignment voltage applied to the pixel electrodes, so that an alignment electric field between the light-shielding metal electrodes and the common electrode is stronger than an alignment electric field between the pixel electrodes and the common electrode.

In the liquid crystal display device described in the present application, the array substrate comprises: a substrate having the display area and the non-display area; the plurality of light-shielding metal electrodes disposed on the substrate and located in the non-display area; an insulating layer disposed on the light-shielding metal electrodes and the substrate; and a pixel electrode layer disposed on the insulating layer comprising the plurality of pixel electrodes and an auxiliary electrode, wherein the pixel electrodes are opposite to the display area, the auxiliary electrode is opposite to the non-display area, and the light-shielding metal electrodes are electrically connected to the auxiliary electrode.

In the liquid crystal display device described in the present application, a thickness of the auxiliary electrode is greater than a thickness of the pixel electrodes, so that a distance between an upper surface of the auxiliary electrode and the common electrode is less than a distance between an upper surface of the pixel electrodes and the common electrode.

In the liquid crystal display device described in the present application, a thickness of the auxiliary electrode is equal to a thickness of the pixel electrodes.

The liquid crystal display panel and the liquid crystal display device provided in the embodiment of the present application provide a large alignment electric field in the non-display area, so that the pretilt angle of the liquid crystal molecules in the non-display area is large, and during display, the alignment electric field can push the liquid crystals in the display area to tilt quickly and improve the response speed.

BRIEF DESCRIPTION OF DRAWINGS

In order to explain the technical solutions in the embodiments of the present application more clearly, the drawings used in the description of the embodiments are briefly introduced below. Obviously, the drawings in the following description are just some embodiments of the application. For those skilled in the art, other drawings can be obtained based on these drawings without making creative labor.

DETAILED DESCRIPTION OF PREFERRED EMBODIMENTS

The technical solutions in the embodiments of the present application will be clearly and completely described below with reference to the drawings in the embodiments of the present application. Obviously, the described embodiments are only a part of the embodiments of the present application, but not all the embodiments. Based on the embodiments in the present application, all other embodiments obtained by those skilled in the art without creative work fall into the protection scope of the present application.

In the description of this application, it should be understood that the terms "first" and "second" are used for descriptive purposes only, and cannot be understood as indicating or implying relative importance or implicitly indicating the number of technical features indicated. Therefore, the features defined as "first" and "second" may explicitly or implicitly comprise one or more of the features. In the description of the present application, the meaning of "a plurality of" is two or more, unless it is specifically and specifically defined otherwise.

Figure 1:
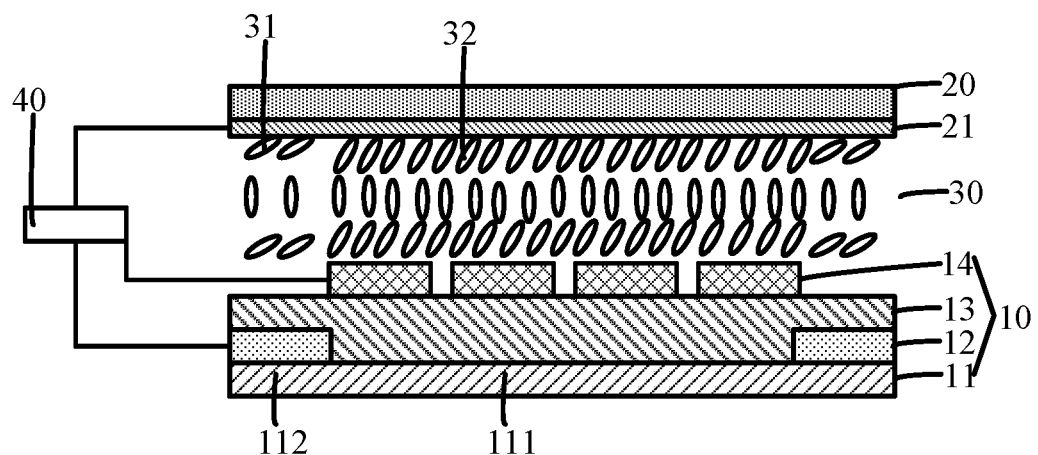
FIG. 1 is a schematic structural diagram of a liquid crystal display panel according to an embodiment of the present application.
Figure 2:
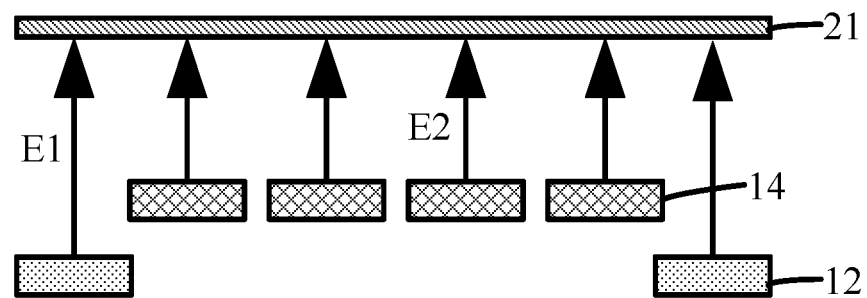
FIG. 2 is a schematic diagram of applying an alignment voltage to a pixel electrode and a light-shielding metal electrode to form an alignment electric field according to an embodiment of the present application.

Please also refer to FIG. 1, FIG. 1 is a schematic structural diagram of a liquid crystal display panel according to an embodiment of the present application. FIG. 2 is a schematic diagram of applying an alignment voltage to a pixel electrode and a light-shielding metal electrode to form an alignment electric field according to an embodiment of the present application. As shown in FIG. 1 and FIG. 2, the liquid crystal display panel comprises: an array substrate 10, a color filter substrate 20, a liquid crystal molecular layer 30, and a voltage alignment circuit 40.

The array substrate 10 comprises a display area 111 and a non-display area 112. The color filter substrate 20 is provided with a common electrode 21 opposite to the display area 111 and the non-display area 112. The liquid crystal molecular layer 30 is disposed between the array substrate 10 and the color filter substrate 20. The voltage alignment circuit 40 is electrically connected to the display area 111 and the non-display area 112 correspondingly, wherein the voltage alignment circuit 40 is configured to apply an alignment voltage to the display area 111 and the non-display area 112, such that an alignment electric field E1 between the non-display area 112 and the common electrode 21 is stronger than an alignment electric field E2 between the display area 111 and the common electrode 21.

Specifically, the liquid crystal molecular layer 30 comprises a first liquid crystal molecular section 32 opposite to the display area 111 and a second liquid crystal molecular section 31 opposite to the non-display area 112, and when the liquid crystal display panel is aligned, a pretilt angle of the first liquid crystal molecular section 32 is smaller than a pretilt angle of the second liquid crystal molecular section 31.

The display area 111 comprises a plurality of pixel electrodes 14, and the non-display area 112 comprises a plurality of light-shielding metal electrodes 12; wherein the voltage alignment circuit 40 is electrically connected to the plurality of pixel electrodes 14 and the plurality of light-shielding metal electrodes 12 correspondingly, such that an alignment voltage is provided to each of the pixel electrodes 14 and each of the light-shielding metal electrodes 12. The voltage alignment circuit 40 can adjust the pretilt angles of the first liquid crystal molecular portion 32 and the second liquid crystal molecular portion 31 by adjusting an alignment voltage applied to the light-shielding metal electrode 12 and the pixel electrode 14.

In some embodiments, a first distance value between the light shielding metal electrode 12 and the common electrode 21 is greater than a second distance value between the pixel electrode 14 and the common electrode 21; that is, the pixel electrode 14 is provided above the light-shielding metal electrode 12.

Therefore, at this time, an alignment voltage applied to the light-shielding metal electrode by the voltage alignment circuit 40 is greater than the alignment voltage applied to the pixel electrode. In addition, an extent to which the alignment voltage applied to the light-shielding metal electrode by the voltage alignment circuit 40 is greater than the alignment voltage applied to the pixel electrode is set based on the difference between the first distance value and the second distance value, in a bid to ensure that the alignment electric field between the light shielding metal electrode 12 and the common electrode 21 is stronger than that between the pixel electrode 14 and the common electrode.

Optionally, in some embodiments, a first distance value between the light shielding metal electrode 12 and the common electrode 21 is equal to a second distance value between the pixel electrode 14 and the common electrode 21; that is, the pixel electrode 14 and the light-shielding metal electrode 12 are disposed on the same layer and have the same thickness. The alignment voltage applied by the voltage alignment circuit 40 to the light shielding metal electrode 12 is greater than the alignment voltage applied to the pixel electrode 14, so that the alignment electric field between the light shielding metal electrode 12 and the common electrode 21 is stronger than that between the pixel electrode 14 and the common electrode. In this article, the array substrate is below and the color filter substrate is above.

Optionally, in some embodiments, a first distance value between the light shielding metal electrode 12 and the common electrode 21 is smaller than a second distance value between the pixel electrode 14 and the common electrode 21; that is, the pixel electrode 14 is disposed below the light-shielding metal electrode 12. The alignment voltage applied by the voltage alignment circuit 40 to the light shielding metal electrode 12 is greater than or equal to the alignment voltage applied to the pixel electrode 14, so that the alignment electric field between the light shielding metal electrode 12 and the common electrode 21 is stronger than that between the pixel electrode 14 and the common electrode 21.

Figure 3:
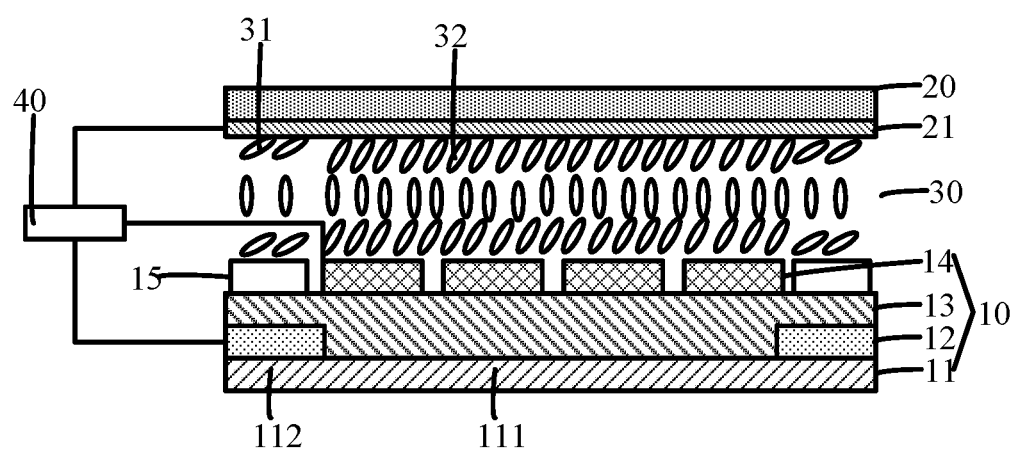
FIG. 3 is another schematic structural diagram of a liquid crystal display panel according to an embodiment of the present application.

In some embodiments, please refer to FIG. 3, FIG. 3 is another schematic structural diagram of a liquid crystal display panel according to an embodiment of the present application. The difference between the liquid crystal display panel shown in FIG. 3 and the liquid crystal display panel shown in FIG. 1 is that the structure of the liquid crystal display panel shown in FIG. 3 and the liquid crystal display panel shown in FIG. 1 are different. As shown in FIG. 3, the array substrate 10 comprises a substrate 11, a pixel electrode layer, a light-shielding metal electrode 12, and an insulating layer 13. The substrate 11 has a display area 111 and a non-display area 112; the light-shielding metal electrode 12 is disposed on the substrate 11 and is located in the non-display area 112; the insulating layer 13 is provided on the light-shielding metal electrode 12 and the substrate 11; the pixel electrode layer is disposed on the insulating layer 13. The pixel electrode layer comprises a plurality of pixel electrodes 14 and an auxiliary electrode 15. The pixel electrode 14 is opposite to the display area 111, and the auxiliary electrode 15 is opposite to the non-display area 112. The light shielding metal electrode 12 is electrically connected to the auxiliary electrode 15. In this embodiment, due to the existence of the auxiliary electrode 15, an alignment voltage applied to the light shielding metal electrode 12 is applied to the auxiliary electrode 15, and the distance between the light shielding metal electrode 12 and the common electrode is greatly reduced, thereby improving the alignment electric field between the two. The auxiliary electrode 15 and the light-shielding metal electrode 12 can be connected through vias.

In some embodiments, the thickness of the auxiliary electrode 15 is greater than the thickness of the pixel electrode 14, so that the distance between the upper surface of the auxiliary electrode 15 and the common electrode 21 is less than the distance between the upper surface of the pixel electrode 14 and the common electrode 21. Therefore, when the alignment voltage is applied, the alignment voltage applied to the auxiliary electrode 15 is greater than or equal to the alignment voltage applied to the pixel electrode 14, so that the alignment electric field E1 between the non-display area 112 and the common electrode 21 is guaranteed to be stronger than the alignment electric field E2 between the display area 111 and the common electrode 21.

In some embodiments, the thickness of the auxiliary electrode 15 is equal to the thickness of the pixel electrode 14. When the alignment voltage is applied, the alignment voltage applied to the auxiliary electrode 15 is greater than the alignment voltage applied to the cover pixel electrode 14, so that the alignment electric field E1 between the non-display area 112 and the common electrode 21 is guaranteed to be stronger than the alignment electric field E2 between the display area 111 and the common electrode 21.

The liquid crystal display panel provided in the embodiment of the present application provides a large alignment electric field in the non-display area, so that the pretilt angle of the liquid crystal molecules in the non-display area is large, and the liquid crystals in the display area can be quickly tilted during display, thereby improving the response speed.

An embodiment of the present application further provides a liquid crystal display device, which comprises the liquid crystal display panel in any of the foregoing embodiments. For details, refer to the foregoing description, and details are not described herein.

The above are only examples of the present application, and thus do not limit the patent scope of the present application. Any equivalent structure or equivalent process transformation made by using the description and drawings of the present application, or directly or indirectly used in other related technical fields, are all comprised in the scope of patent protection of this application.

What is claimed is:

1. A liquid crystal display panel, comprising:
   an array substrate defining with a display area and a non-display area;
   a color filter substrate comprising a common electrode, wherein the common electrode is disposed opposite to the display area and the non-display area;
   a liquid crystal molecular layer disposed between the array substrate and the color filter substrate; and
   a voltage alignment circuit electrically connected to the display area and the non-display area correspondingly, wherein the voltage alignment circuit is configured to apply an alignment voltage to the display area and the non-display area, such that an alignment electric field at the non-display area is greater than an alignment electric field at the display area, and wherein the array substrate comprises:
   a substrate;
   a plurality of light-shielding metal electrodes disposed on the substrate and located in the non-display area;
   an insulating layer disposed on the light-shielding metal electrodes and the substrate; and
   a pixel electrode layer disposed on the insulating layer and comprising a plurality of pixel electrodes located in the display area and an auxiliary electrode located in the non-display area, wherein the light-shielding metal electrodes are electrically connected to the auxiliary electrode, and the voltage alignment circuit is electrically connected to the plurality of pixel electrodes and the plurality of light-shielding metal electrodes correspondingly, such that the alignment voltage is provided to each of the pixel electrodes and each of the light-shielding metal electrodes.

2. The liquid crystal display panel of claim 1, wherein the liquid crystal molecular layer comprises a first liquid crystal molecular section disposed at the display area and a second liquid crystal molecular section disposed at the non-display area, and a pretilt angle of the first liquid crystal molecular section is smaller than a pretilt angle of the second liquid crystal molecular section.

3. The liquid crystal display panel of claim 1, wherein a first distance value between the light-shielding metal electrodes and the common electrode is greater than a second distance value between the pixel electrodes and the common electrode; and
   wherein the voltage alignment circuit is configured to provide a value of the alignment voltage applied to the light-shielding metal electrodes greater than a value of the alignment voltage applied to the pixel electrodes.

4. The liquid crystal display panel of claim 1, wherein a first distance value between the light-shielding metal electrodes and the common electrode is equal to a second distance value between the pixel electrodes and the common electrode; and
   wherein the voltage alignment circuit is configured to provide a value of the alignment voltage applied to the light-shielding metal electrodes greater than a value of the alignment voltage applied to the pixel electrodes.

5. The liquid crystal display panel of claim 1, wherein a first distance value between the light-shielding metal electrodes and the common electrode is less than a second distance value between the pixel electrodes and the common electrode; and
   wherein the voltage alignment circuit is configured to provide a value of the alignment voltage applied to the light-shielding metal electrodes greater than or equal to a value of the alignment voltage applied to the pixel electrodes, so that an alignment electric field between the light-shielding metal electrodes and the common electrode is greater than an alignment electric field between the pixel electrodes and the common electrode.

6. The liquid crystal display panel of claim 1, wherein a thickness of the auxiliary electrode is greater than a thickness of the pixel electrodes, so that a distance between an upper surface of the auxiliary electrode and the common electrode is less than a distance between an upper surface of the pixel electrodes and the common electrode.

7. The liquid crystal display panel of claim 1, wherein a thickness of the auxiliary electrode is equal to a thickness of the pixel electrodes.

8. A liquid crystal display device, comprising a liquid crystal display panel, wherein the liquid crystal display panel comprises:
   an array substrate defining with a display area and a non-display area;
   a color filter substrate comprising a common electrode, wherein the common electrode is disposed opposite to the display area and the non-display area;
   a liquid crystal molecular layer disposed between the array substrate and the color filter substrate; and
   a voltage alignment circuit electrically connected to the display area and the non-display area correspondingly, wherein the voltage alignment circuit is configured to apply an alignment voltage to the display area and the non-display area, such that an alignment electric field at the non-display area is greater than an alignment electric field at the display area, and wherein the array substrate comprises:
   a substrate;
   a plurality of light-shielding metal electrodes disposed on the substrate and located in the non-display area;
   an insulating layer disposed on the light-shielding metal electrodes and the substrate; and
   a pixel electrode layer disposed on the insulating layer and comprising a plurality of pixel electrodes located in the display area and an auxiliary electrode located in the non-display area, wherein the light-shielding metal electrodes are electrically connected to the auxiliary electrode, and the voltage alignment circuit is electrically connected to the plurality of pixel electrodes and the plurality of light-shielding metal electrodes correspondingly, such that the alignment voltage is provided to each of the pixel electrodes and each of the light-shielding metal electrodes.

9. The liquid crystal display device of claim 8, wherein the liquid crystal molecular layer comprises a first liquid crystal molecular section disposed at the display area and a second liquid crystal molecular section disposed at the non-display area, and a pretilt angle of the first liquid crystal molecular section is smaller than a pretilt angle of the second liquid crystal molecular section.

10. The liquid crystal display device of claim 8, wherein a first distance value between the light-shielding metal electrodes and the common electrode is greater than a second distance value between the pixel electrodes and the common electrode; and
    wherein the voltage alignment circuit is configured to provide a value of the alignment voltage applied to the light-shielding metal electrodes greater than a value of the alignment voltage applied to the pixel electrodes.

11. The liquid crystal display device of claim 8, wherein a first distance value between the light-shielding metal electrodes and the common electrode is equal to a second distance value between the pixel electrodes and the common electrode; and
    wherein the voltage alignment circuit is configured to provide a value of the alignment voltage applied to the light-shielding metal electrodes greater than a value of the alignment voltage applied to the pixel electrodes.

12. The liquid crystal display device of claim 8, wherein a first distance value between the light-shielding metal electrodes and the common electrode is smaller than a second distance value between the pixel electrodes and the common electrode; and
    wherein the voltage alignment circuit is configured to provide a value of the alignment voltage applied to the light-shielding metal electrodes greater than or equal to a value of the alignment voltage applied to the pixel electrodes, so that an alignment electric field between the light-shielding metal electrodes and the common electrode is greater than an alignment electric field between the pixel electrodes and the common electrode.

13. The liquid crystal display device of claim 8, wherein a thickness of the auxiliary electrode is greater than a thickness of the pixel electrodes, so that a distance between an upper surface of the auxiliary electrode and the common electrode is less than a distance between an upper surface of the pixel electrodes and the common electrode.

14. The liquid crystal display device of claim 8, wherein a thickness of the auxiliary electrode is equal to a thickness of the pixel electrodes.

* * * * *